(12) United States Patent
Kitamura et al.

(10) Patent No.: US 7,172,895 B2
(45) Date of Patent: Feb. 6, 2007

(54) MICROORGANISM AND DRAINAGE METHOD

(76) Inventors: Takuya Kitamura, c/o Asahi Industrial Co., Ltd. 24-5, Doyama-cho, Kadoma, Osaka (JP) 571-0050; Satoru Kurozumi, c/o Asahi Industrial Co., Ltd. 375-1, Mizokuchi, Mizokuchi-cho, Hino-Gun, Tottori (JP) 689-4201; Ryuichiro Kurane, c/o Research Institute of Bioscience and Human-Technology, Aist, Miti 1-3, Higashi 1-Chome, Tsukuba, Ibaraki (JP) 305-0046

( * ) Notice: Subject to any disclaimer, the term of this patent is extended or adjusted under 35 U.S.C. 154(b) by 216 days.

(21) Appl. No.: 10/133,933

(22) Filed: Apr. 25, 2002

(65) Prior Publication Data

US 2003/0203470 A1    Oct. 30, 2003

(51) Int. Cl.
*C12N 11/20*    (2006.01)
(52) U.S. Cl. .................. 435/253.3; 424/93.47
(58) Field of Classification Search ............. 435/253.3, 435/198; 424/93.47
See application file for complete search history.

(56) References Cited

U.S. PATENT DOCUMENTS 3,875,007 A * 4/1975 Kobayashi .................. 435/198
5,489,530 A * 2/1996 Braatz et al. ............ 435/253.3
5,998,198 A   12/1999 Nakayama et al.

FOREIGN PATENT DOCUMENTS

| EP | 0999274 A2 | 10/1998 |
|---|---|---|
| EP | 1002858 A1 | 11/1999 |
| JP | 08-197086 | 8/1996 |
| JP | 09-085283 | 3/1997 |
| JP | 9085283 | 3/1997 |
| JP | 11-047789 | 2/1999 |
| JP | 11047789 | 2/1999 |
| JP | 11075822 | 3/1999 |
| JP | 2002237789 | 9/2000 |
| JP | 2002125659 | 5/2002 |
| WO | WO 97/40135 | 10/1997 |

OTHER PUBLICATIONS http://www.atcc.org/common/catalog/bacteria/bacterialIndex.cfm.*
Helena Hustavova, Dana Havranekova, Selection of Microorganisms for Biodegradation of Crude Oil Carbohydrates, Ekologia, vol. 13, 1994, pp. 123-130.

* cited by examiner

*Primary Examiner*—Irene Marx
(74) *Attorney, Agent, or Firm*—Milord A. Keshishian

(57) ABSTRACT

This invention relates to drainage process wherein *Burkholderia cepacia* AIK bacterial strain (FERM BP-7308) contacts disposed drainage and the new microorganism can aerobically decompose liquid and solid oil and fat and other organic matter in wide range of temperatures and a drainage process that uses the new microorganism.

2 Claims, 2 Drawing Sheets

MICROORGANISM AND DRAINAGE METHOD

BACKGROUND OF THE INVENTION

This invention relates to a new microorganism and drainage method, and its purpose is to provide new microorganism and drainage method using the new microorganism that can effectively decompose liquid and solid oil and fat and other organic matter in wide range of temperatures.

Animal and vegetable oil and fat are often contained in large quantities in drain systems when discharged from food factories, restaurants and residences. In the usual case, oil and fat included in disposed drainage are separated and removed by plain flotation machine and pressure flotation machine. In the existing physical and chemical separating and removing methods, oil and fat in drainage is not removed perfectly. The drainage that includes oil and fat is provided to a decomposing tank, and the oil and fat is separated and removed by biological disposal processes such as the plankton method which may include activated sludge system and a biofilm process such as a rotating organism contact process.

As a biological disposal process for drainage which includes oil and fat, for example, is disclosed in the official gazette Tokukaihei 8-197986, wherein the decomposing disposal process of oil and fat of animals and plants included in drainage is accomplished by using a particular bacterial strain belonging to pseudomonad.

Further, in the official gazette Tokukaihei 9-85283, a disposal process for drainage using bacteria belonging to the *Burkholderia* strain that can decompose oil and fat of animals and vegetables included in drainage is disclosed.

Furthermore, in the official gazette Tokukaihei 11-47798, decomposing disposal process of oil and fat of animals and vegetables included in drainage by using particular a bacterial strain belonging to the pseudomonad strain is disclosed.

However, in the conventional disposal process of drainage as mentioned above, there have been several problems as exemplified hereinafter.

Oil and fat decomposing bacteria that are used in conventional drainage processes are able to decompose oil and fat in specific temperature ranges. For example, the bacteria that are disclosed in official gazette Tokukaihei 9-85283, can decompose oil and fat in temperature ranges above 40 centigrade. However, the temperature within the decomposing tank that is used for biological decomposition is known to have a large temperature change based upon weather conditions, seasonal changes or location. As a result, conventional oil and fat decomposing bacteria fails to demonstrate high decomposing ability in a decomposing tank that is subject to high temperature change. As a result, the water quality of treated water that is disposed in the decomposing tank and discharged is not always fixed; also sometimes the treated water is discharged without decomposing perfectly.

In addition, bacteria capable of decomposing oil and fat that are used in the above mentioned disposal process of drainage can decompose liquid oil and fat, but they have a greater difficulty in decomposing solid oil and fat. In cases where a large quantity of solid oil and fat are included in the drain, sometimes anaerobe and bad smell occurs with deteriorating water quality in treated water.

In view of above-mentioned subject, as a result of study, a bacterial strain belonging to *Burkholderia cepacia* is found as it has high decomposing ability in decomposing liquid and solid oil and fat in a wide range of temperatures.

SUMMARY OF THE INVENTION

Accordingly, it is a general object of the present invention to overcome the disadvantages of the prior art.

That is, the present invention relates to *Burkholderia cepacia* AIK bacterial strain (FERM BP-7308).

The present invention relates to at least a preferred disposal process for drainage wherein the drainage and *Burkholderia* are in contact such that the microorganism can decompose oil and fat.

The present invention relates to a disposal process for drainage wherein a microorganism is capable of decomposing activated sludge.

The present invention relates to a disposal process of drainage wherein a microorganism belongs to the *Burkholderia* strain in general, and more specifically is the *Burkholderia cepacia* AIK bacterial strain (FERM-BP-7308).

DETAILED DESCRIPTION OF THE INVENTION

First, a microorganism that relates to the present invention is explained.

The microorganism that relates to the present invention is a bacterium that were acquired by sampling and screening soil obtained from the Okinawa Prefecture Ishigaki Island, and it was observed to not only have superior decomposing ability in decomposing oil and fat in a wide range of temperatures, but also decomposing ability in relation to organic matter such as fatty acid, protein, carbohydrate and saccharides.

At least a preferred separation process of the new microorganism that relates to the present invention is explained as follows.

First, 126 soil samples that were collected in Okinawa Prefecture Ishigaki Island were cultured in culture media (1). Only samples that had grown well in culture media (1) were then cultured in culture media (2). In the same way, six (6) samples were obtained finally by culturing only well grown samples in the following culture medias.

(1) Nutrition culture media having 5% olive oil composition was adjusted by the composition of a table 1, described hereinafter, was dissolved in 1000.00 ml aqua purificata, to which yeast extract and casamino acid were added in the amount of 1.0 g/L respectively.
(2) Nutrition culture media having 10% olive oil.
(3) Nutrition culture media having 10% olive oil. Further, a subculture was done three times.
(4) Actual drain.
(5) Nutrition culture media having 2% lard.
(6) Nutrition culture media having 2% salad oil.
(7) Nutrition culture media having 10% lard.
(8) Nutrition culture media having 1% salad oil. Further, a subculture was done three times.
(9) Nutrition culture media having 2% suet.

Regarding the six (6) samples separated by the above-mentioned process, the amount of decomposition in lipase activity and drainage which included oil and fat were measured and a sample illustrating the best results were selected.

As such, *Burkholderia cepacia* AIK bacterial strain was separated from soil obtained from Okinawa Prefecture Ishigaki Island.

Mycological nature of separated *Burkholderia cepacia* AIK bacterial strain is explained as follows. Further, an example of mycological nature and a classification were done based on the description of E. Yabuuchi et al., Microbiology and Immunology, 36, 1251–1275, 1992.

(1) Morphological nature
- (a) Form and size of a cell; *Bacillus* of length 1.0~1.5 μm, width 0.8 μm
- (b) Gram chromatic; –
- (c) Cystoid spore; –
- (d) Mobility; +
- (e) Configuration of colony; orbicular, wavy margin, low convex, surface banded structure and yellow (water-soluble pigment)
- (f) Flagella epiphytic; polar flagellation (2) Nature of culture
- (a) bouillon liquid culture; surface epithelial formation
- (b) litmus milk; unchanged (3) Physiological nature
- (a) Catalase; +
- (b) Oxytase ; +
- (c) O/F examination; –
- (d) Nitrate reduction; +
- (e) Indo1 production; –
- (f) Glucose acidification; –
- (g) Arginine dihydrolase; +
- (h) Urease; –
- (i) Esculin hydrolysis; +
- Gelatin hydrolysis; –
- (k) β-galactosidase; –
- (l) Denitrification reaction; –
- (m) MR example; +
- (n) VP example; –
- (o) $H_2S$ production; –
- (p) Starch hydrolysis; –
- (q) Utilization of citric acid; Koser/+, Christensen/+
- (r) Utilization of source of inorganic azote; $NaNO_3$/+, $(NH_4)_2/SO_4$/+
- (s) Pigment producing; water soluble yellow pigment
- (t) Anaerobic growth; –
- (u) Decomposing of Tween 80; +
- (v) Decomposing of poly-β-hydroxybutyric acid; –
- (w) Substrate assimilation ability; glucose, L-arabinose, D-mannose, D-mannitol, N-acetyl-D-glucosamine, gluconate potassium, n-capric acid, adipic acid, DL-malic acid, sodium citrate and phenyl acetate are assimilated. Maltose is not assimilated.
- (x) Whether creation of acid from saccharides is or not; glucose, xylose, mannitol, lactose and malt sugar create acid.
- (y) Creation of acid and gas by OF culture media (acid/gas); L-arabinose (–/–), D-xylose (+/–), D-glucose (+/–), D-mannose (–/–), D-fructose (–/–), D-galactose (+/–), maltose (+/–), sucrose (+/–), lactose (+/–), trehalose (+/–), D-sorbitol (–/–), D-mannitol (+/–), inositol (–/–), glycerine (–/–), starch (–/–).

From said mycological nature and description derived from the above-mentioned documents, both catalase and oxidase show cryptic in gram cryptic *Bacillus* that has mobility, and judging from the acid produced from glucose, the new microorganism of the present invention is identified as a microorganism that belongs to *Burkholderia.*

Further, the new microorganism that relates to the present invention produces acid from glucose, xylose, mannitol, lactose and maltose and shows arginine dihydrolase criptic, and is judged to be a microorganism that belongs to *Burkholderia cepacia*, and it is named as *Burkholderia cepacia* AIK bacterial strain.

The *Burkholderia cepacia* AIK bacterial strain was deposited as microorganism deposit number FERM BP-7308 with the National Institute of Bioscience and Human-technology of Industrial Science and Technology Ministry of International Trade and Industry on Sep. 25, 2000. The address of the dipository is 1–3, Higashi 1 chome, Tsukuba-shi, Ibaraki-ken, 305-8566 Japan. The complete taxonomic description of the microorganism is *Burkholderia cepacia* AIK (FERM BP-7308).

A culture media that is used to culture *Burkholderia cepacia* AIK bacterial strain is not particularly limited, and regular fluid medium and solid medium and solid medium are used. As a nutrient, nutrients such as a carbon source and an inorganic salt that are needed to grow bacteria is available. As a carbon source, glucose, cane sugar, honey and starch can be used. As a nitrogen source, both organic nitrogen sources and inorganic nitrogen sources can be used. For purposes of illustration but not limitation, as organic nitrogen sources, peptone, yeast extract, malt infusion, meat extract, soybean decomposition and urea can be used, and as an inorganic nitrogen source, ammonium nitrate and sodium nitrate can be used. An inorganic salt, such as, but not limited to, phosphate, magnesium sulfate, potassium, natrium, calcium, copper, manganese, zinc, calcium chloride and iron II sulfuric acid can be used.

The pH of culture media is 2.0~12.0, and a pH of 5.0~8.0 is preferred, 6.0~8.0 is more preferable and 7.0~8.0 is most preferable.

Also, the temperature of culture media can vary as long as the temperature is maintained within a range that allows *Burkholderia cepacia* AIK bacterial strain to grow, in particular, the temperature is preferably between 15~45 degrees centigrade, and a temperature between 20~35 centigrade is more preferable.

The *Burkholderia cepacia* AIK bacterial strain can decompose oil and fat efficiently. Temperature that the *Burkholderia cepacia* AIK bacterial strain decompose oil and fat is not particularly limited, but a range between 15~45 degrees centigrade is preferable and between 20~35 degrees centigrade is more preferable. Usually, the temperature of a decomposing tank fluctuates between the range of 20~35 degrees centigrade, a range within which the *Burkholderia cepacia* AIK bacterial strain has excellent decomposing ability within a decomposing tank.

Also, the *Burkholderia cepacia* AIK bacterial strain can decompose both animal and vegetable oil and fat efficiently, further, the *Burkholderia cepacia* AIK bacterial strain can decompose not only salad oil, olive oil and sesame oil that are liquid in normal temperature, but can also decompose lard, suet and coconut oil that are solid in normal temperature. Furthermore, as described hereinafter, the *Burkholderia cepacia* AIK bacterial strain can decompose the drainage to an extremely low quantity in a short time.

The *Burkholderia cepacia* AIK bacterial strain can decompose oil and fat in the presence of detergents. That is, the *Burkholderia cepacia* AIK bacterial strain can decompose oil and fat, even if the oil and fat is in an actual drain system containing a mixture including detergent.

Moreover, in addition to oil and fat, the *Burkholderia cepacia* AIK bacterial strain can suitably decompose fatty acid such as lauric acid, myristic acid and oleic acid, in addition to organic matter such as protein, carbohydrate and saccharides. The temperature to decompose these organic matters is not particularly limited, and is sufficiently similar for oil and fat, and the temperature range is between 15~45 degrees centigrade, and a range of 15~40 degrees centigrade is preferable and 20~35 degrees centigrade is more preferable.

Drain method that relates to the present invention is explained following. The drain method that relates to the present invention makes contacting bacteria that belongs to *Burkholderia* and drain characteristics.

Figure 3:
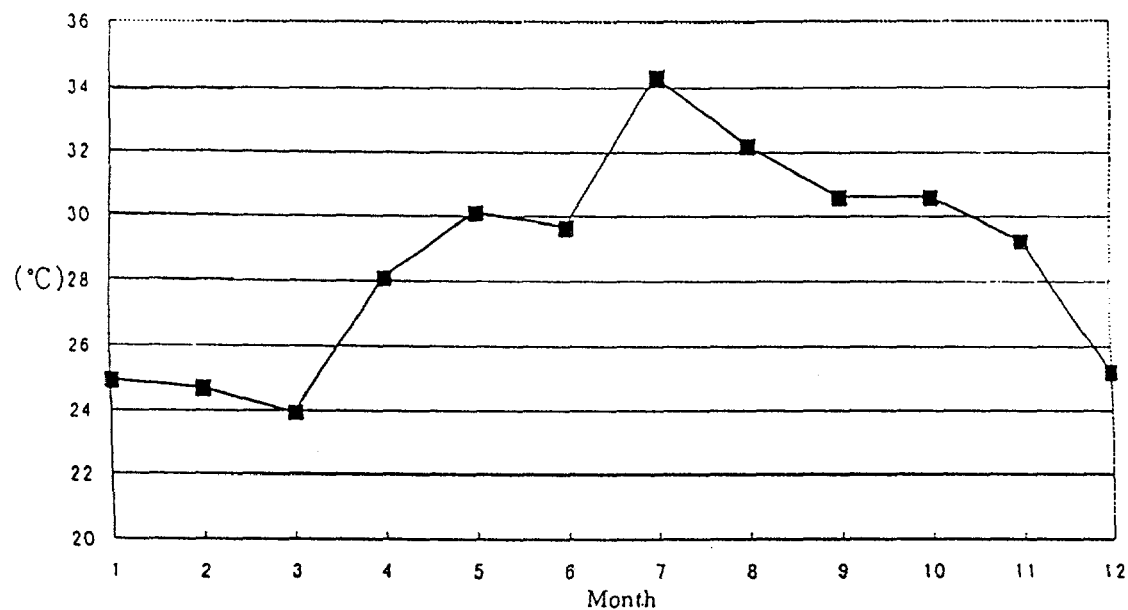
FIG. 3 is a graph that shows mean temperature of every month in a decomposing tank.

The choice of bacteria is not limited to the genus *Burkholderia*, and any bacteria may be used as long as they can decompose oil and fat, but bacteria that can decompose oil and fat in wide range of temperatures are preferable. The reason is that the temperature in a decomposing tank is not fixed, and it varies widely as a result of many conditions such as weather, seasonal changes or location of the tank. Now referring to FIG. 3, a graph that shows a change of average temperature in a decomposing tank is provided. To measure the effects of temperature changes in the decomposing tank in relation to the decomposing ability of the microorganisms, the water quality of treated water in the decomposing tank was tracked. It was observed that the decomposing ability of the microorganism declines over time, and sometimes treated water was drained which included oil and fat that was not decomposed perfectly.

Figure 4:
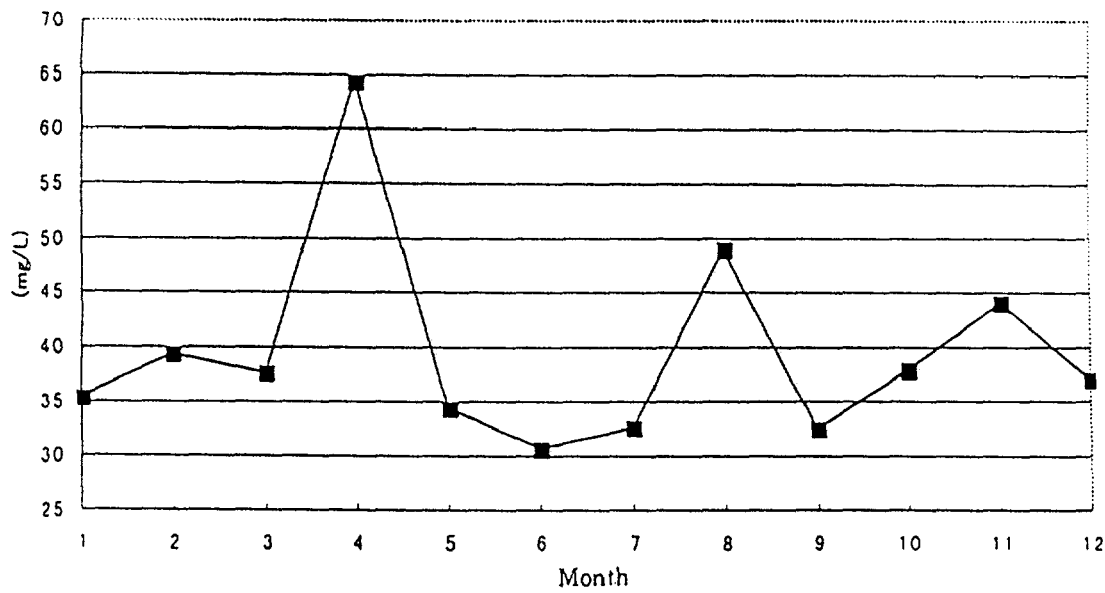
FIG. 4 is a graph that shows mean quantity of every month of n-hexane extract in disposal water in a decomposing tank.

Now referring to FIG. 4, a graph shows the quantity of n-hexane extracted from the decomposing tank, that is, a measurement of the amount of oil and fat found in the treated water drained from the decomposing tank was measured. In other words, by using bacteria that can demonstrate high decomposing ability in a wide range of temperatures to which a decomposing tank is subject, particularly between 15~40 degrees centigrade, 20~35 degrees centigrade is more preferable, even if a temperature change has occurred in the decomposing tank, the decomposing ability does not decline, and stable and efficient disposal is accomplished.

Further, by using microorganisms belonging to the genus *Burkholderia*, decomposition of not only liquid oil and fat but also of solid oil and fat in normal temperatures is accomplished. The reason is that in normal temperatures, both liquid and solid oil and fat are included in drainage that flows into a decomposing tank. Bacteria that belong to the genus *Burkholderia* can decompose, in addition to oil and fat, organic matters such as fatty acid, protein, carbohydrate and saccharides. The reason is that by decomposing organic matters, it can decrease biological oxygen demand (BOD) and chemical oxygen demand (COD) in the drain.

Bacteria that can fulfill the above-mentioned conditions belongs to the species *Burkholderia cepacia* and specific examples of the bacteria is the *Burkholderia cepacia* AIK bacterial strain (FERM BP-7308).

The disposal process of drain waste of the present invention can be selected from plankton methods such as activated sludge method, rotating creature contact method, tricking filter method, catalytic oxidation method, biofilm process such as aerobic filter method or immobilized microorganism method. That is, bacteria that belong to the genus *Burkholderia* can be used as a preferred microorganism that comprises an activated sludge, and can also be used as a group of microorganisms that compose biological slime that are adhered to the surface of a disc, further, can be used as group of microorganisms that are maintained in a vector.

The drainage disposal method of the present invention can decompose oil and fat without being influenced by environmental conditions such as the season, weather conditions and location of the decomposing tank, because the drain disposal method can suitably decompose liquid and solid oil and fat without being influenced by a temperature change in the decomposing tank. Further, the drainage disposal method can prevent occurrence of a bad odors by restraining propagation of anaerobes, and it can always demonstrate high decomposing ability, hence the water quality of the treated water that is disposed and discharged from the decomposing tank can be kept almost constant.

EXAMPLES

Based on following examples the present invention is explained in detail, but it is understood that the detailed explanation are for purposes of illustration and not limitation.

(Preparation of Sample and Comparative Sample)

*Burkholderia cepacia* AIK bacterial strain was cultured as a preparation described in example 1 below. Further, Super H bacteria (brand name, made by KONDO FRP) were cultured as a preparation of comparative sample in example 1, activated sludge (cultured by National Institute of Bioscience and human-technology of Industrial Science and Technology Ministry of International Trade and Industry) was cultured as a preparation of comparative example 2.

Example 1

Decomposition of Lard

Compositions shown in table 1 were dissolved in 1000.0 ml of aqua purificata, then they were adjusted by culture media, to which 500 ppm lard and 10 ppm detergent were added to sterilize the same. The aqua purificata mixture was made to simulate a synthetic drain by shaking for 16 hours at a speed of 150 rpm. The synthetic drain was confirmed to have similar characteristics of an actual drain.

Next, preparations of 20 ml (including dry weight of 0.06 g of body cells) that was pre-cultured in LB culture media were washed with said adjusted synthetic drain, and they were added to 200 ml of the synthetic drain and were shake cultured at 30 degrees centigrade and 150 rpm.

Finally, the concentration of lard present in the synthetic drain was measured at fixed time intervals. As a way of measurement, concentration of n-hexane extract in the synthetic drain was measured as extraction efficiency of 98.6% (three controls were made and measured). Three samples were made per measurement, and their mean was found. Further, the same experiment was done using preparations of comparative example 1.

The result is shown in Table 2.

TABLE 1

| | |
|---|---|
| potassium hydrogenphosphate | 0.2 g |
| dipotassium hydrogenphosphate | 1.6 g |
| ammonium sulfate | 1.0 g |
| ammonium sulfate 7 hydrate | 0.2 g |
| iron sulfate 7 hydrate | 0.01 g |
| calcium chloride 2 hydrate | 0.02 g |
| sodium manganate (IV) | 0.5 mg |
| manganese sulfate | 0.5 mg |
| sodium chloride | 0.1 g |

TABLE 2

|  | 0 hour | 2 hours | 4 hours | 9 hours | 24 hours |
|---|---|---|---|---|---|
| Example (ppm) | 500 | 319 | 126 | 45 | 3 |
| Comparative Example 1 (ppm) | 500 | 413 | 342 | 259 | 264 |

As shown in Table 2, compared with comparative example 1, *Burkholderia cepacia* AIK bacterial strain that relates to the present invention showed remarkable superior decomposing ability. The bacterial strain of the instant invention decomposed solid oil and fat to about a quarter of its original concentration in 4 hours and to about one tenth of the original concentration of solid oil and fat in 9 hours. Furthermore, it decomposed the concentration to almost non-existent levels in 24 hours.

Example 2

Decomposition of Salad Oil

In the culture medium as used in example 1, 500 ppm of salad oil and 10 ppm of detergent were added and sterilized. The aqua purificata mixture was made to simulate a synthetic drain by shaking for 16 hours at a speed of 150 rpm. The synthetic drain was confirmed to have similar characteristics of an actual drain.

Next, 20 ml of preparations (including dry weight of 0.06 g of body cells) that was pre-cultured in LB culture media was washed with said adjusted synthetic drain, and they were added to 200 ml of the synthetic drain, and they were shake cultured at 30 degrees centigrade and at 150 rpm.

Finally, the concentration of salad oil present in the synthetic drain was measured at fixed time intervals. As a way of measurement, concentration of n-hexane extract in the synthetic drain was measured as extraction efficiency of 97.5% (three controls were made and measured). Three samples were made per measurement, and their mean was found.

Further, the same experiment was done using preparations of comparative example 1 and comparative example 2.

The result is shown in Table 3.

TABLE 3

|  | 0 hour | 2 hours | 4 hours | 7 hours | 9 hours | 24 hours |
|---|---|---|---|---|---|---|
| Example (ppm) | 500 | 307 | 67 | — | 54 | 7 |
| Comparative Example 1 (ppm) | 500 | 495 | 465 | — | 393 | 18 |
| Comparative Example 2 (ppm) | 500 | 466 | 330 | 172 | — | — |

As shown in Table 3, compared with comparative example 1 and 2, *Burkholderia cepacia* AIK bacterial strain that relates to the present invention showed remarkable superior decomposing ability. The bacterial strain of the instant invention decomposed solid oil and fat to about one seventh of its original concentration in 4 hours and to about one tenth of the original concentration of solid oil and fat in 9 hours. Furthermore, it decomposed the concentration to almost non-existent levels after 24 hours.

Example 3

Temperature Dependency in Decomposition of Oil and Fat

In the culture medium as used in example 1, 500 ppm of salad oil and 10 ppm of detergent were added and sterilized. The aqua purificata mixture was made to simulate a synthetic drain by shaking for 16 hours at a speed of 150 rpm. The synthetic drain was confirmed to have similar characteristics of an actual drain.

Next, 20 ml of preparations (including dry weight of 0.06 g of body cells) that was pre-cultured in LB culture media were washed with said adjusted synthetic drain, and they were added to 200 ml of the synthetic drain and were shake cultured at a fixed temperature and 150 rpm for 4 hours.

Finally, the decomposition rate of salad oil that in the synthetic drain was measured over a period of time. As a way of measurement, concentration of n-hexane extract in the synthetic drain was measured as extraction efficiency 97.5% (three controls were made and measured).

Three samples were made per measurement, and their mean was found.

Further, the decomposition rate of the salad oil was measured by using preparations of comparative example 1.

Figure 1:
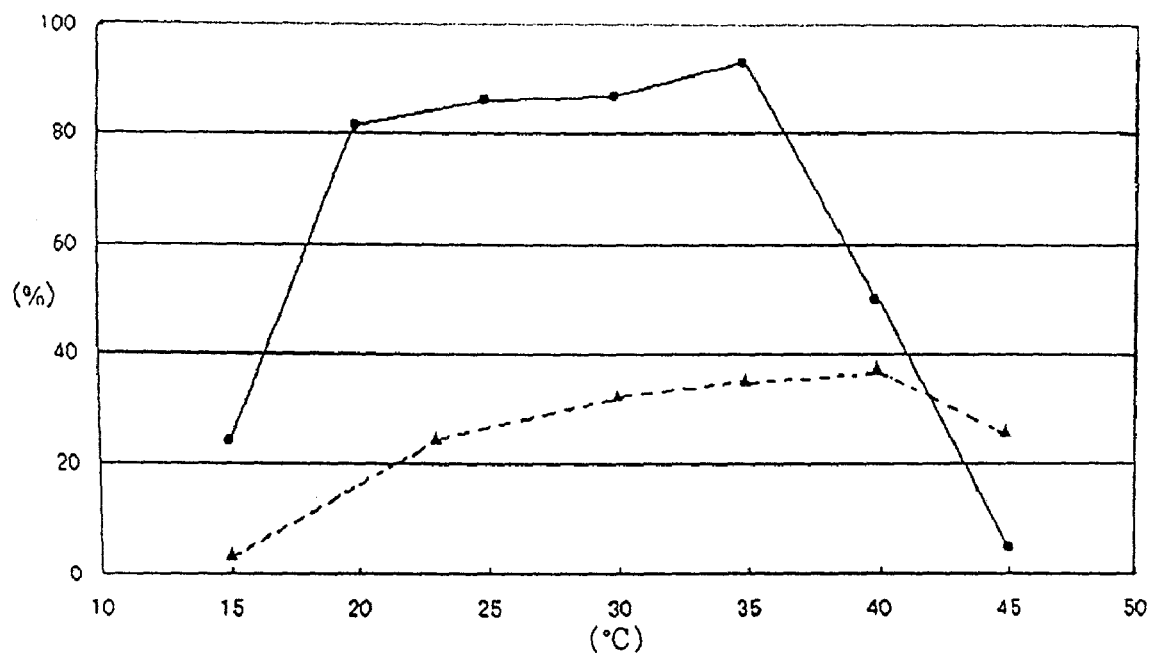
FIG. 1 is a graph that shows the result of the example 3.

The results are shown in Table 4 and FIG. 1. In FIG. 1, the solid line shows the instant example, and the broken line shows the results of comparative example 1 within the graph.

TABLE 4

|  | 15° C. | 20° C. | 23° C. | 25° C. | 30° C. | 35° C. | 40° C. | 45° C. |
|---|---|---|---|---|---|---|---|---|
| Example (%) | 24.2 | 81.4 | — | 86.0 | 86.6 | 93.0 | 50.0 | 4.8 |
| Comparative Example 1 (%) | 3.7 | — | 25.0 | — | 32.6 | 35.7 | 37.7 | 36.1 |

As shown in Table 4 and FIG. 1, *Burkholderia cepacia* AIK bacterial strain of the present invention is understood to have a decomposing ability in low temperatures of less than 15 degrees centigrade and high temperatures over 40 degrees centigrade. Furthermore, the instant strain functions in a temperature range of about 20–35 degrees centigrade, and is understood to have excellent decomposing ability to where more than 80% decomposition can always be demonstrated.

Example 4

Influence of Change of Quantity of Bacteria in Decomposition of Salad Oil

In the culture medium as used in example 1, 500 ppm of salad oil and 10 ppm of detergent were added in a sterile environment. The aqua purificata mixture was made to simulate a synthetic drain by shaking for 16 hours at a speed of 150 rpm. The synthetic drain was confirmed to have similar characteristics of an actual drain.

Next, 20 ml of preparations (including dry weight 3.0 g of body cell in 1 litter of the culture media) that was pre-cultured in LB culture media was washed with said adjusted synthetic drain, and they were added to 200 ml of the synthetic drain and were shake cultured at 30 degrees centigrade and 150 rpm for 4 hours.

Finally, the concentration of salad oil in the synthetic drain was measured. As a way of measurement, concentration of n-hexane extract in the synthetic drain was measured as extraction efficiency of 97.5% (three controls were made and measured). Three samples were made per measurement, and their mean was found.

The result is shown in Table 5.

TABLE 5

|  | 0 ml | 1 ml | 8 ml | 15 ml | 20 ml |
|---|---|---|---|---|---|
| Concentration (ppm) | 495 | 401.5 | 231 | 150 | 183 |

As shown in Table 5, *Burkholderia cepacia* AIK bacterial strain of the present invention can decompose oil and fat in a short time, even if it is added in very small quantities.

Example 5

Decomposition of Oil and Fat in an Actual Drain

After actual drain was gathered, it was sterilized and filtered. The quantity of n-hexane extract in this drain was 15 ppm.

Next, after salad oil was added so that the quantity of n-hexane extract to be 500 ppm, it was shake cultured for 16 hours.

After 20 ml of preparations (including dry weight of 0.06 g of body cells) that was pre-cultured in LB culture media were washed with said adjusted drain, they were added to 200 ml of the synthetic drain and were shake cultured at 30 degrees centigrade and 150 rpm.

Finally, concentration of the n-hexane extract in the drain was measured at fixed time intervals.

Three samples were made per measurement, and their mean was found. The result is shown in Table 6.

TABLE 6

|  | 0 hour | 3 hours | 5 hours | 9 hours | 24 hours |
|---|---|---|---|---|---|
| Example (ppm) | 500 | 207 | 99 | 14 | 17 |

As shown in Table 6, the *Burkholderia cepacia* AIK bacterial strain of the present invention demonstrates almost the same ability as illustrated with respect to the synthetic drain as detailed in Table 3 above and the corresponding explanation therefor.

Example 6

Peptone's Influence in Decomposing Salad Oil

In the culture medium as used in experiment 1, 500 ppm of salad oil, 10 ppm of detergent and 0.1% of peptone were added and sterilized. The aqua purificata mixture was made to simulate a synthetic drain by shaking for 16 hours at a speed of 150 rpm.

Next, by the same method as explained above in relation to experiment 2, the concentration of n-hexane extract in the synthetic drain was measured at fixed time intervals. The result is shown in Table 7.

TABLE 7

|  | 0 hour | 2 hour | 4 hour | 7 hour |
|---|---|---|---|---|
| Example (ppm) | 500 | 326 | 61 | 11 |

As shown in Table 7, the *Burkholderia cepacia* AIK bacterial strain of the present invention can demonstrate almost the same ability to decompose oil and fat in the presence of peptone as without (refer to the results the above experiment in the absence of peptone shown in Table 3).

Example 7

The Influence of pH in the Decomposition of Salad Oil

In the culture medium as used in example 1, of the pH of the culture medium was adjusted as shown in Table 8 and measured by a pH meter by using 0.5 N of HC1 and 0.5 N of NaOH. 500 ppm of salad oil and 10 ppm of detergent were added and the medium was sterilized. The mixture was made to simulate a synthetic drain by shaking for 16 hours at a speed of 150 rpm. Next, 20 ml of preparations (including dry weight of 0.06 g of body cells in 1 litter of the culture media) that was pre-cultured in LB culture media were washed with said adjusted synthetic drain, they were added to 200 ml of the synthetic drain and were shake cultured at 30 degrees centigrade and 150 rpm for 4 hours.

Finally, the concentration of the salad oil in the synthetic drain was measured. As a way of measurement, the concentration of n-hexane extract in the synthetic drain was measured as extraction efficiency 97.5% (three controls were made and calculated specially). Three samples were made per measurement, and their mean was found.

Figure 2:
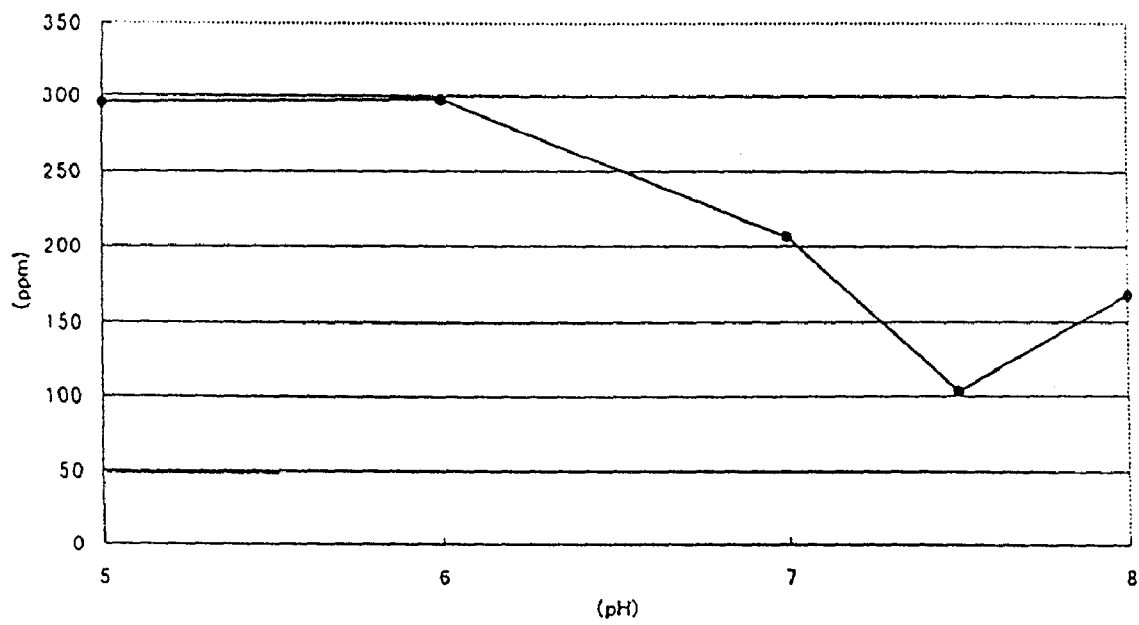
FIG. 2 is a graph that shows the result of the example 7.

The result is shown in Table 8 and FIG. 2.

TABLE 8

|  | pH 5.0 | pH 6.0 | pH 7.0 | pH 7.5 | pH 8.0 |
|---|---|---|---|---|---|
| Example (ppm) | 296 | 298 | 206 | 104 | 168 |

As shown in Table 8 and FIG. 2, *Burkholderia cepacia* AIK bacterial strain of the present invention can decompose oil and fat in wide range of pH. In particular, it demonstrates remarkable superior decomposing ability in pH levels between 7.0~8.0.

Example 8

Decomposing of Salad Oil in Tap Water 500 ppm of salad oil was added to tap water, then it was sterilized, and it was made to resemble synthetic drain by shaking for 16 hours at a speed of 150 rpm. Next, 20 ml of preparations (including dry weight of 0.06 g of body cells) that was pre-cultured in LB culture media were washed with physiological saline, they were added to 200 ml of the adjusted synthetic drain and were done shake cultured at 30 degrees centigrade at 150 rpm for 24 hours.

Finally, the concentration of the salad oil in the synthetic drain was measured. As way of measurement, the concentration of n-hexane extract in the synthetic drain was measured as extraction efficiency of 97.5% (three controls were made and measured).

Further, the same experiment was done by using preparations of comparative example 1.

Furthermore, measurements were taken in a similar manner for each of the preparations of the sample, comparative example 1, and the control.

The results of each sample measured, each three times, are shown in the table 9.

TABLE 9

| Example (ppm) | 43 | 45 | 68 |
|---|---|---|---|
| Comparative Example 1 (ppm) | 355 | 341 | 401 |
| Control (ppm) | 360 | 376 | 341 |

As shown in Table 9, the *Burkholderia cepacia* AIK bacterial strain that relates to the present invention is active and decomposes oil and fat, even in nutritionally poor environments except for oil and fat.

Example 9

Influence of Detergent in Decomposition of Lard

In a culture medium having a similar composition as in example 1, 500 ppm of lard was added to tap water and then sterilized. The mixture was made to simulate synthetic drain by shaking for 16 hours at a speed of 150 rpm. Next, 20 ml of preparations (including dry weight of 0.06 g of body cells) of the sample that was pre-cultured in LB culture media were washed with physiological saline, and added to 200 ml of the said adjusted synthetic drain and were shake cultured at 30 degrees centigrade at 150 rpm for 24 hours. Finally, the concentration of the lard in the synthetic drain was measured. As a way of measurement, the concentration of n-hexane extract in the synthetic drain was measured as extraction efficiency of 98.6% (three controls were made and measured) over fixed periods of time. Three samples were made per measurement, and their mean was found.

The result is shown in Table 10.

TABLE 10

| | 0 hour | 2 hours | 5 hours | 9 hours | 24 hours |
|---|---|---|---|---|---|
| Example (ppm) | 500 | 459 | 332 | 227 | 114 |

As shown in Table 10, the decomposing ability of the *Burkholderia cepacia* AIK bacterial strain of the present invention is decreased in relation to solid oil and fat when detergent is added (refer to the results of the example shown in Table 2 wherein the same experiment was done without adding detergent).

Example 10

Influence of Detergent in the Decomposition of Salad Oil

In the culture medium as used in example 1, 500 ppm of salad oil was added to tap water and sterilized. The mixture was made to simulate a synthetic drain by shaking for 16 hours at a speed of 150 rpm. Next, 20 ml of preparations (including dry weight of 0.06 g of body cell) that was pre-cultured in LB culture media were washed with physiological saline, and they were added to 200 ml of said adjusted synthetic drain and were shake cultured at 30 degrees centigrade and 150 rpm for 24 hours. Finally, the concentration of the salad oil in the synthetic drain was measured. As a way of measurement, concentration of n-hexane extract in the synthetic drain was measured at specific time intervals having an extraction efficiency of 98.6% (three controls were made and measured).

Three samples were made per measurement, and their mean was found.

The result is shown in Table 11.

TABLE 11

| | 0 hour | 2 hours | 4 hours | 6 hours | 24 hours |
|---|---|---|---|---|---|
| Example (ppm) | 500 | 461 | 344 | 176 | 40 |

As shown in Table 11, the decomposing ability of the *Burkholderia cepacia* AIK bacterial strain of the present invention is decreased in relation to liquid oil and fat when detergent is added (refer to the results of the example shown in Table 3 wherein the same experiment was done without adding detergent).

Example 11

Decomposition of Salad Oil in Inoculated with Activated Sludge

In a culture medium having a similar composition as in example 1, 500 ppm of salad oil and 10 ppm of detergent were added to tap water and sterilized. The mixture was made to simulate synthetic drain by shaking for 16 hours at a speed of 150 rpm. The synthetic drain was confirmed to have the same characteristics of an actual drain.

Next, 20 ml of preparations (including dry weight of 0.06 g of body cell) that was pre-cultured in LB culture media were washed with physiological saline, and inserted into 200 ml of activated sludge and were shake cultured at 30 degrees centigrade at 150 rpm.

Finally, the concentration of the salad oil in the synthetic drain was measured after 9 hours. As a way of measurement, the concentration of n-hexane extract in the synthetic drain was measured after a specific period of time and having an extraction efficiency of 97.5% (three controls were made and measured). Three samples were made per measurement, and their mean was found.

Further, the similar experiment was done.

The result is shown in Table 12.

TABLE 12

| | 0 hours | 9 hours |
|---|---|---|
| Example (ppm) | 500 | 322 |
| Comparative Example 2 (ppm) | 500 | 393 |

As shown in Table 12, the *Burkholderia cepacia* AIK bacterial strain of the present invention demonstrates decomposing ability with respect to oil and fat, even if it in the presence of activated sludge.

Example 12

Decomposition of Fatty Acid

An experiment for measuring the ability of *Burkholderia cepacia* AIK bacterial strain to decompose fatty acid was conducted. As a matrix, the fatty acid composition of lard and salad oil was analyzed, and trolein that is a single glyceride of oleic acid having the greatest presence in both was used.

In the experimental method, first, in the culture medium as used in experiment 1, 500 ppm of triolein and 10 ppm of detergent were added to tap water and sterilized. The mixture was made to simulate a synthetic drain by shaking for 16 hours at a speed of 150 rpm.

Next, 20 ml of preparations (including dry weight of 0.06 g of body cells) that was pre-cultured in LB culture media were washed with physiological saline, they were added to 200 ml of activated sludge and were shake cultured at 30 degrees centigrade at 150 rpm.

Finally, the total concentration of n-hexane extract that was included in the synthetic drain after one hour, two hours and four hours was methylated, and after adding Heptadecanoate acid as internal standard material with an equal amount, each of its fixed amount was analyzed by gas chromatography. A peak area that had passed one hour was set the standard; a peak area of oleic acid that was corrected with internal standard material is shown in Table 13.

TABLE 13

|  | After 1 hour | After 2 hours | After 4 hours |
|---|---|---|---|
| Peak area (after correction) | 41059 | 30898 | 13188 |

As shown in Table 13, *Burkholderia cepacia* AIK bacterial strain that relates to the present invention can decompose fatty acids such as, but not limited to, oleic acid in a short time.

(Effect of the Invention)

The *Burkholderia cepacia* AIK bacterial strain that relates to the present invention has high decomposing ability in relation to oil and fat in a wide range of temperatures. In particular, in the range of about 20~35 degrees centigrade, it always maintains its decomposing ability. Regarding decomposition of oil and fat, not only liquid oil and fat, but also solid oil and fat, the *Burkholderia cepacia* AIK bacterial strain has almost the same decomposing ability for both states of matter.

Further, in addition to oil and fat, the *Burkholderia cepacia* AIK bacterial strain can decompose organic matter such as fatty acids, proteins, carbohydrates, and saccharides, and it can decrease biochemical oxygen demand (BOD) and chemical oxygen demand (COD) in drain.

The drains treated by a process that relates to the present invention is a treatment process of the drain that uses bacteria capable of decomposing oil and fat efficiently. Hence it can decompose and treat the drains consistently without being influenced by temperature of the decomposing tank. Consequently, the *Burkholderia cepacia* AIK bacterial strain can prevent proliferation of anaerobes and prevent the occurrence of bad odors.

While the above description contains many specifics, these should not be construed as limitations on the scope of the invention, but rather as an exemplification of preferred embodiments thereof. Many other variations are possible without departing from the essential spirit of this invention. Accordingly, the scope of the invention should be determined not by the embodiment illustrated above, but rather by the appended claims and their legal equivalents.

What is claimed is:

1. A biologically pure culture of *Burkholderia cepacia* AIK FERM-BP-7308.

2. A biologically pure culture of *Burkholderia cepacia* AIK FERM-BP-7308, wherein the culture is active in decomposing organic matter in the presence of a detergent.

* * * * *